(12) United States Patent
Uchida

(10) Patent No.: US 7,526,153 B2
(45) Date of Patent: Apr. 28, 2009

(54) OPTICAL ELEMENT DEVICE AND TWO-DIMENSIONAL OPTICAL WAVEGUIDE DEVICE AND OPTOELECTRONIC CIRCUIT BOARD USING THE SAME

(75) Inventor: Tatsuro Uchida, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/541,188

(22) PCT Filed: Aug. 10, 2004

(86) PCT No.: PCT/JP2004/011728

§ 371 (c)(1),
(2), (4) Date: Jun. 30, 2005

(87) PCT Pub. No.: WO2005/017592

PCT Pub. Date: Feb. 24, 2005

(65) Prior Publication Data

US 2006/0245681 A1 Nov. 2, 2006

(30) Foreign Application Priority Data

Aug. 15, 2003 (JP) ............................... 2003-293666

(51) Int. Cl.
G02B 6/26 (2006.01)
G02B 6/42 (2006.01)

(52) U.S. Cl. ................ 385/18; 385/50; 385/15

(58) Field of Classification Search .............. 385/16.15, 385/508
See application file for complete search history.

(56) References Cited

U.S. PATENT DOCUMENTS

| | | | |
|---|---|---|---|
| 5,170,448 A * | 12/1992 | Ackley et al. .................. 385/31 |
| 5,786,925 A | 7/1998 | Goossen et al. .............. 359/245 |
| 5,835,646 A | 11/1998 | Yoshimura et al. ............ 385/14 |
| 5,999,670 A * | 12/1999 | Yoshimura et al. ............ 385/31 |
| 6,483,098 B1 | 11/2002 | Kato et al. ................ 250/214.1 |
| 6,829,398 B2 * | 12/2004 | Ouchi .......................... 385/14 |
| 2002/0028045 A1 * | 3/2002 | Yoshimura et al. ............ 385/50 |
| 2003/0039455 A1 * | 2/2003 | Ouchi .......................... 385/88 |
| 2003/0099426 A1 * | 5/2003 | Baker et al. .................... 385/15 |
| 2003/0113067 A1 * | 6/2003 | Koh et al. ...................... 385/48 |
| 2003/0152354 A1 | 8/2003 | Uchida ........................ 385/129 |
| 2004/0047539 A1 | 3/2004 | Okubora et al. ............... 385/14 |

(Continued)

FOREIGN PATENT DOCUMENTS

EP 0 603 549 A1 6/1994

(Continued)

OTHER PUBLICATIONS

Oct. 11, 2004 International Search Report in PCT/JP2004/011728.

(Continued)

*Primary Examiner*—K. Cyrus Kianni
(74) *Attorney, Agent, or Firm*—Fitzpatrick, Cella, Harper & Scinto

(57) ABSTRACT

An optical element device comprises an optical element and an optical path transforming structure for changing a light proceeding direction in order to couple light with the optical element or light from said optical element with some other element, in which said optical path transforming structure is formed by processing a substrate where said optical element is formed.

2 Claims, 12 Drawing Sheets

U.S. PATENT DOCUMENTS

| | | | |
|---|---|---|---|
| 2004/0120675 A1* | 6/2004 | Skinner et al. | 385/129 |
| 2005/0100298 A1 | 5/2005 | Okubora et al. | 385/129 |
| 2005/0201707 A1* | 9/2005 | Glebov et al. | 385/132 |

FOREIGN PATENT DOCUMENTS

| | | | |
|---|---|---|---|
| EP | 603549 A1 * | 6/1994 |
| EP | 1 286 194 A2 | 2/2003 |
| EP | 1286194 A2 * | 2/2003 |
| JP | 8-209364 | 8/1996 |
| JP | 9-260764 | 10/1997 |
| JP | 2000-183390 | 6/2000 |
| JP | 2000-199827 | 7/2000 |
| JP | 2000-235127 | 8/2000 |
| JP | 2002-353552 | 12/2002 |
| JP | 2003-057468 | 2/2003 |
| JP | 2003-227951 | 8/2003 |

OTHER PUBLICATIONS

Oct. 11, 2004 Written Opinion in PCT/JP2004/011728.
Patent Abstracts of Japan, vol. 2000, No. 11, Jan. 3, 2001 (JP-A-2000-235127, Aug. 29, 2000).
Mar. 2, 2006 International Preliminary Report on Patentability in PCT/JP2004/011728.

* cited by examiner

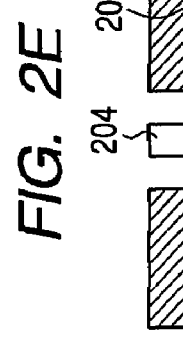
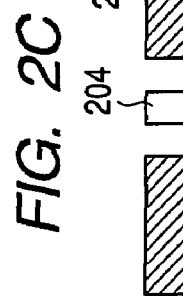
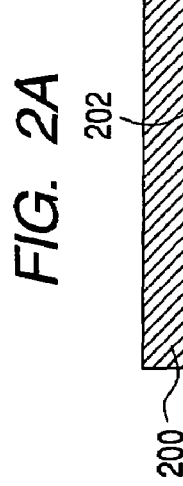
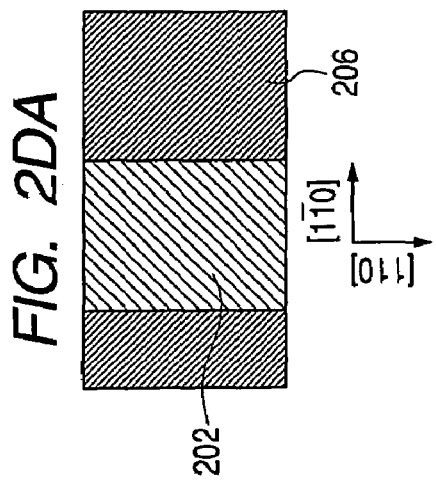
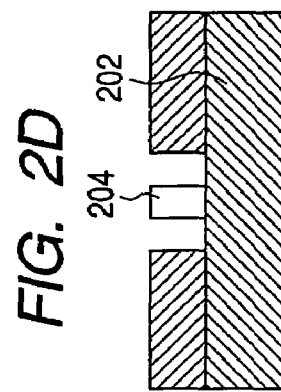
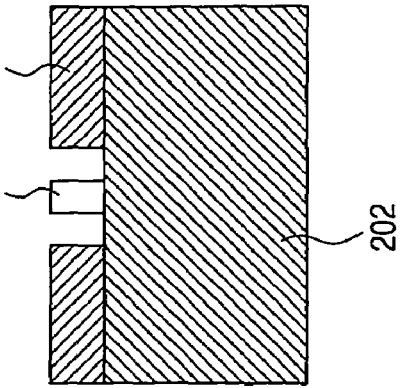

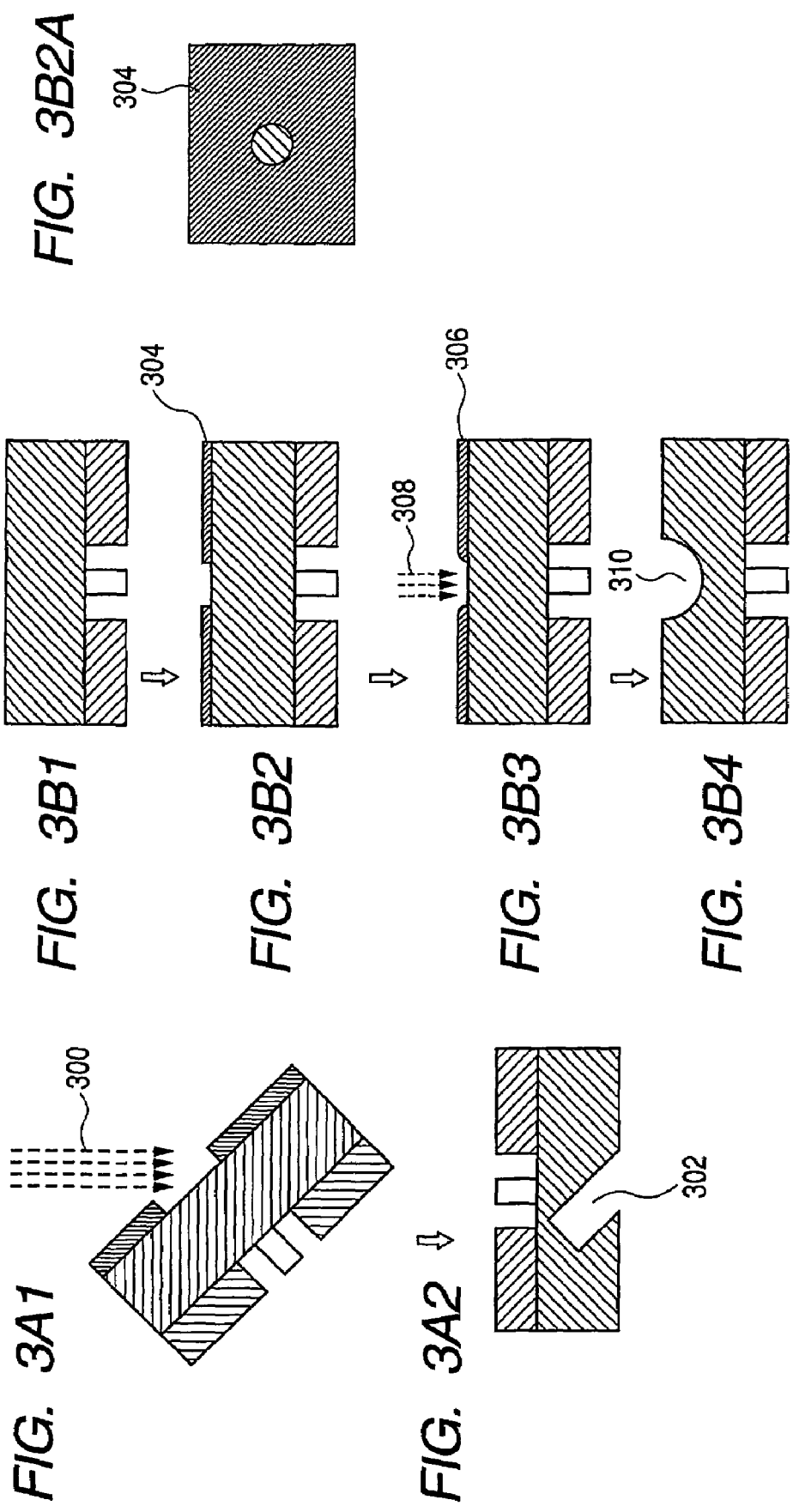

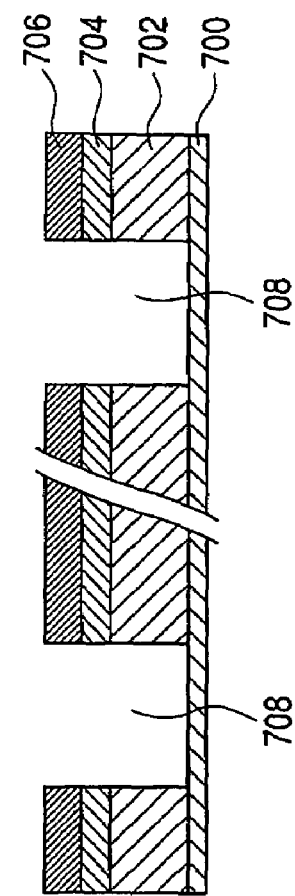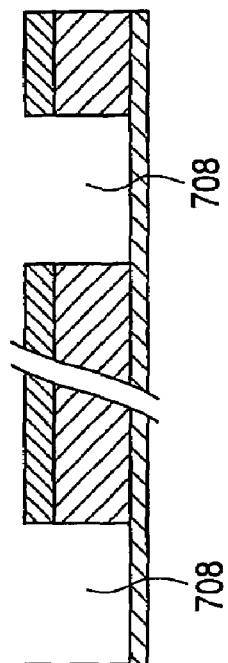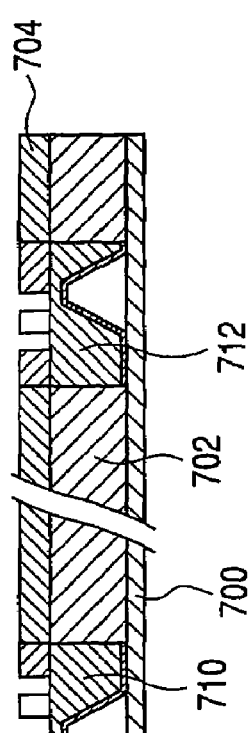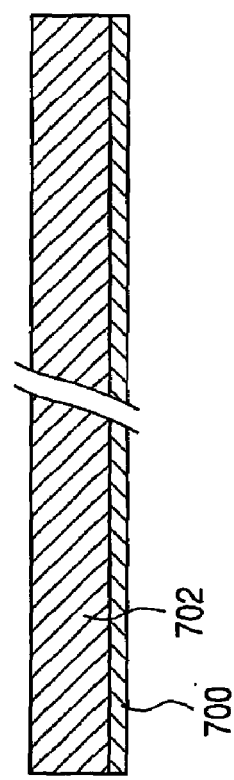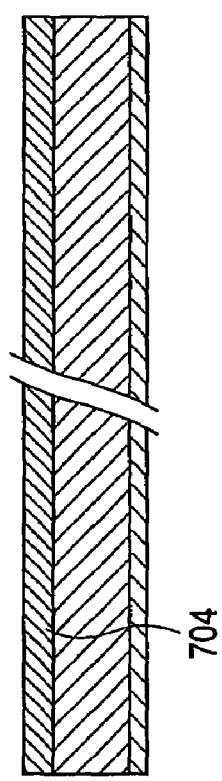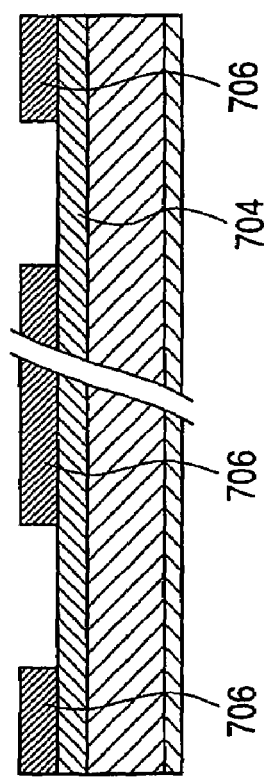

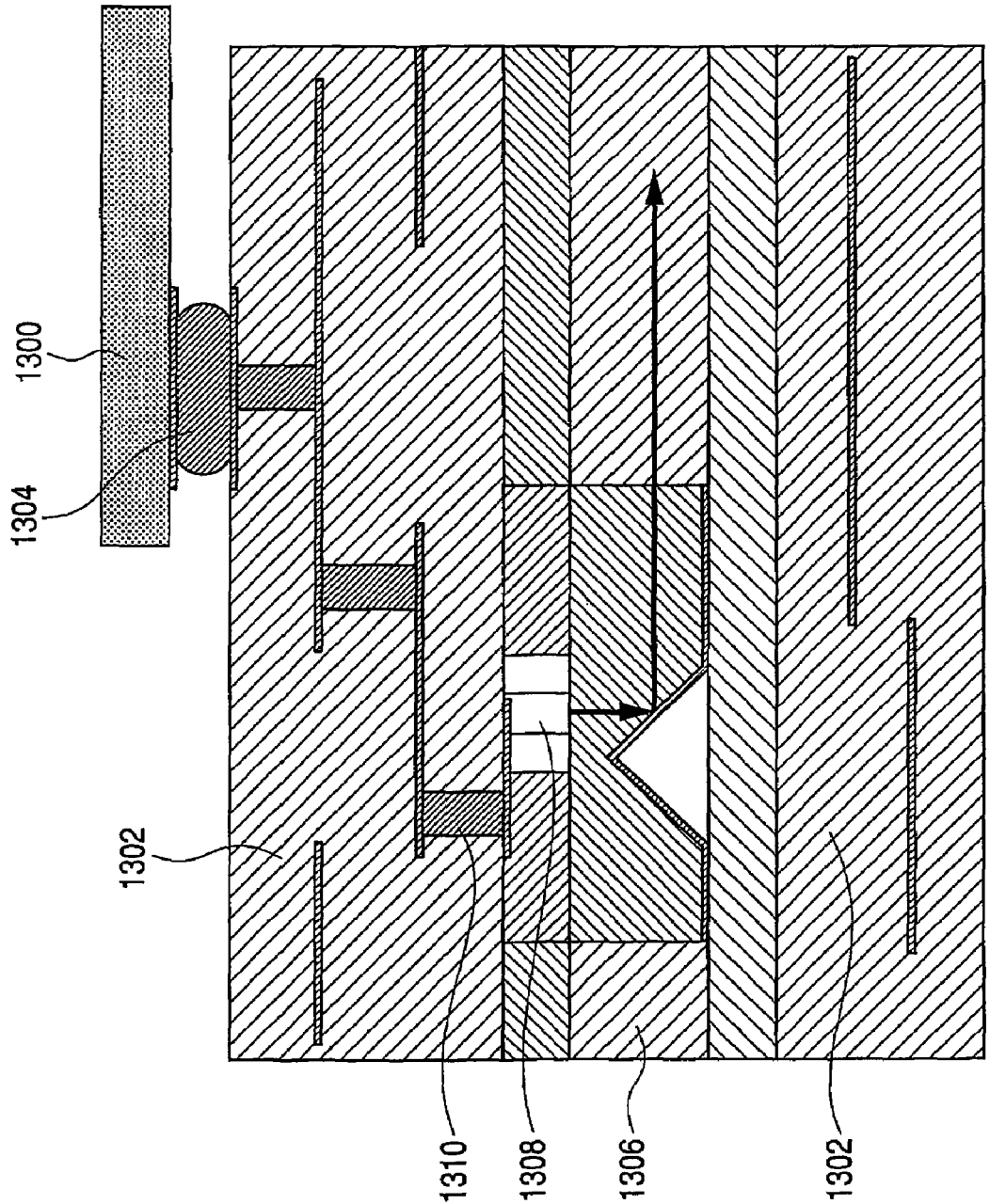

OPTICAL ELEMENT DEVICE AND TWO-DIMENSIONAL OPTICAL WAVEGUIDE DEVICE AND OPTOELECTRONIC CIRCUIT BOARD USING THE SAME

TECHNICAL FIELD

This invention relates to an optical element device (that comprises a light emitting element and/or a light receiving element and an optical path transforming structure integrally formed with such an element). It also relates to a two-dimensional optical waveguide device comprising such an optical element device and an optoelectronic circuit board carrying such a two-dimensional optical waveguide device along with an electric wiring layer and an optical wiring layer.

BACKGROUND ART

As mobile phones and personal information terminals are rapidly becoming popular, there is an increasing demand for such devices that are more compact, lightweight and, at the same time, functionally sophisticated. Compact, lightweight and functionally sophisticated devices of the type under consideration entail development of high speed operating circuit boards and an enhanced level of integration, which by turn give rise to various problems including signal delays and EMIs (electromagnetic interferences). Expectations are high with regard to optical wiring techniques that can overcome or reduce the problems of signal delays, signal degradations and electromagnetic interferences produced from wires as such problems are serous with conventional electric wiring. Known devices that exploit advantages of optical wiring include the following.

An optoelectronic circuit board as disclosed in U.S. Pat. No. 5,835,646 is so designed that an optical wiring section and an electric wiring section are separated from each other therein and light being propagated through an optical waveguide arranged on a base member is modulated by driving an optical switch or an optical modulator also arranged on the base member according to a voltage signal from an electronic device so as to convert an electric signal into an optical signal in order to transmit it and also convert an optical signal into an electric signal by means of a light receiving element arranged on said base member or some other base member in order to convey the signal to some other electronic device or to the same electronic device. An optical waveguide device as disclosed in Japanese Patent Application Laid-Open No. 2000-199827 is so designed that a mirror is formed in a linear polymer waveguide in order to efficiently couple beams of light going out from or entering the optical waveguide perpendicularly relative to the latter.

The technique as disclosed in U.S. Pat. No. 5,835,646 is intended to compensate the problems of electric wiring by optical wiring. However, because optical wiring provides a transmission line (linear polymer waveguide), the site for electric/optical signal conversion or optical/electric signal conversion can automatically be defined and hence is limited. On the other hand, with the technique as disclosed in Japanese Patent Application Laid-Open No. 2000-199827, it can be difficult to mount a light emitting element on a linear optical waveguide having at an end thereof a mirror that is inclined by 45° so as to efficiently couple optical signals and to mount a light receiving element on the linear optical waveguide so as to efficiently receive an optical signal propagated through the latter because such a technique requires a high alignment accuracy. Additionally, because the technique involves the use of a linear optical waveguide, the position of the light emitting element and that of the light receiving element can be restricted to reduce the design freedom particularly when a plurality of optical waveguides need to be formed.

SUMMARY OF THE INVENTION

In an aspect of the present invention, there is provided an optical element device comprising an optical element and an optical path transforming structure for changing a light proceeding direction in order to couple light with the optical element or light from said optical element with some other element, said optical path transforming structure being formed by processing a substrate where said optical element is formed.

With this arrangement, the optical element and the optical path transforming structure can be optically aligned with ease so that the optical element device can be optically coupled to an optical waveguide without difficulty. In other words, it is no longer necessary to highly accurately align optical devices with the optical waveguide layer to couple them efficiently when mounting the former so that the mounting operation can be conducted with ease. Additionally, when a two-dimensional optical waveguide layer is used as optical waveguide, the positional arrangement of an optical element device according to the invention that comprises at least a light emitting element for converting an electric signal into an optical signal or a light receiving element for converting an optical signal into an electric signal is not subjected to particular restrictions and it is easy to realize a two-dimensional optical waveguide device or an optoelectronic circuit board that can exploit an entire two-dimensional waveguide layer so as to flexibly restructure an arrangement for optical signal transmission.

Preferable modes of carrying out the present invention include the following in terms of an optical element device having the above-described basic configuration.

Preferably, said substrate is made of a material that does not absorb light being propagated from the optical element (light emitting element) or to the optical element (light receiving element). A single or a plurality of optical elements (forming an array) may be arranged for the purpose of the invention. For the purpose of the invention, an array of optical elements may include light emitting elements and/or light receiving elements.

Said substrate may be a growth substrate of a semiconductor layer for forming one or more than one optical elements or a layer formed on a semiconductor layer for forming one or more than one optical elements. The latter layer may be a silicon oxide layer typically formed by CVD. The latter layer may not be subjected to rigorous restrictions particularly in terms of thickness. Said growth substrate may be formed by using a compound semiconductor.

When an optical path transforming structure is formed by processing the growth substrate where said one or more than one optical elements are formed, the coupling loss can be controlled with ease by forming the optical path transforming structure by means of a process of forming optical elements (semiconductor process) because the one or more than one optical elements and the optical path transforming structure can be aligned by using the photolithography technique to the level of precision of the latter.

In another aspect of the invention, there is provided an optical waveguide device comprising an optical element device including an optical element and an optical path transforming structure for changing a light proceeding direction in order to couple light with the optical element or light from said optical element with some other element, and an optical waveguide layer optically coupled with said optical element and propagating light from said optical element or to said optical element, said optical path transforming structure being formed by processing a substrate where said optical element is formed.

Preferably, said optical waveguide layer is formed by using a sheet-shaped (two-dimensional) object.

For the purpose of the present invention, said optical path transforming structure may have a spherical, wedge-shaped, conical or pyramidal profile.

Preferably, said optical path transforming structure is formed near the optical element that is a light emitting element so as to couple light emitted from said light emitting element and said light emitting element is so configured as to be able to change its light irradiation angle, while said optical path transforming structure is configured to transform the optical path so as to propagate light emitted from the light emitting element coupled therewith into the inside of said optical waveguide layer as a beam of light or light diffusing with an angle corresponding to the light irradiation angle.

An optical waveguide device according to the invention may be formed by burying an optical path transforming structure into said optical waveguide layer.

Said optical waveguide layer may be formed by using the substrate where said optical element is formed.

When said light emitting element, said light receiving element and said optical path transforming structure are formed on a same substrate (same component member) and light emitted from the light emitting element is optically coupled to the optical waveguide layer or light propagated through the optical waveguide is coupled to the light receiving element, light can be efficiently coupled to the optical waveguide layer so that no high precision alignment is required when mounting optical devices. In other words, the optical device mounting operation is an easy one.

In still another aspect of the invention, there is provided a method of manufacturing an optical element device having an optical element and an optical path transforming structure for changing a light proceeding direction in order to couple light with the optical element or light from said optical element with some other element, said method comprising a step of preparing a substrate for forming said optical element and a step of forming said optical path transforming structure by processing said substrate.

For the purpose of the present invention, the step of forming said optical path transforming structure may include a step of forming a recess in said substrate and forming a metal film in the recess.

For the purpose of the present invention, the step of forming a recess may include a step of irradiating an ion beam on the surface of said substrate in a direction inclined relative to said surface.

For the purpose of the present invention, the step of forming a recess may include a step of dry etching, using a reactive ion beam.

With a manufacturing method according to the invention, said optical path transforming structure may be formed simultaneously with the process of preparing the optical element. The optical path transforming structure and the light emitting element or the optical path transforming structure and the light receiving element may be aligned by means of the photolithography technique to the level of precision of the latter.

In still another aspect of the present invention, there is provided an optoelectronic circuit board comprising an electric circuit board formed so as to establish electric connection with an optical waveguide device having an optical element device including an optical element and an optical path transforming structure for changing a light proceeding direction in order to couple light with the optical element or light from said optical element with some other element, and an optical waveguide layer optically coupled with said optical element and propagating light from said optical element or to said optical element, said optical path transforming structure being formed by processing a substrate where said optical element is formed.

An optical element device comprising an optical path transforming structure as well as a light emitting device and/or light receiving device can efficiently optically couple the optical element(s) with the optical waveguide and the optical element(s) can be easily mounted in a two-dimensional optical waveguide layer. Additionally, when transmitting an optical signal through a two-dimensional optical waveguide device comprising an optical element device according to the invention, the optical signal transmitting region can be restructured with ease.

BRIEF DESCRIPTION OF THE DRAWINGS

FIGS. 2A, 2B, 2C, 2D, 2DA, 2E and 2F are schematic illustrations of the first embodiment of optical element device according to the invention, showing a method of manufacturing it;

FIGS. 3A1, 3A2, 3B1, 3B2, 3B2A, 3B3 and 3B4 are schematic illustrations of an embodiment obtained by modifying the first embodiment of optical element device, showing a method of manufacturing it.

FIGS. 7A, 7B, 7C, 7D, 7E and 7F are schematic illustrations of the second embodiment of two-dimensional optical waveguide device according to the invention, showing a method of manufacturing it;

FIG. 11 is a schematic cross sectional view of the fourth embodiment of optoelectronic circuit board, illustrating the inside thereof.

BEST MODE FOR CARRYING OUT THE INVENTION

Now, the present invention will be described in greater detail by referring to the accompanying drawings that illustrate preferred embodiments of the invention.

Embodiment 1

Figure 1:
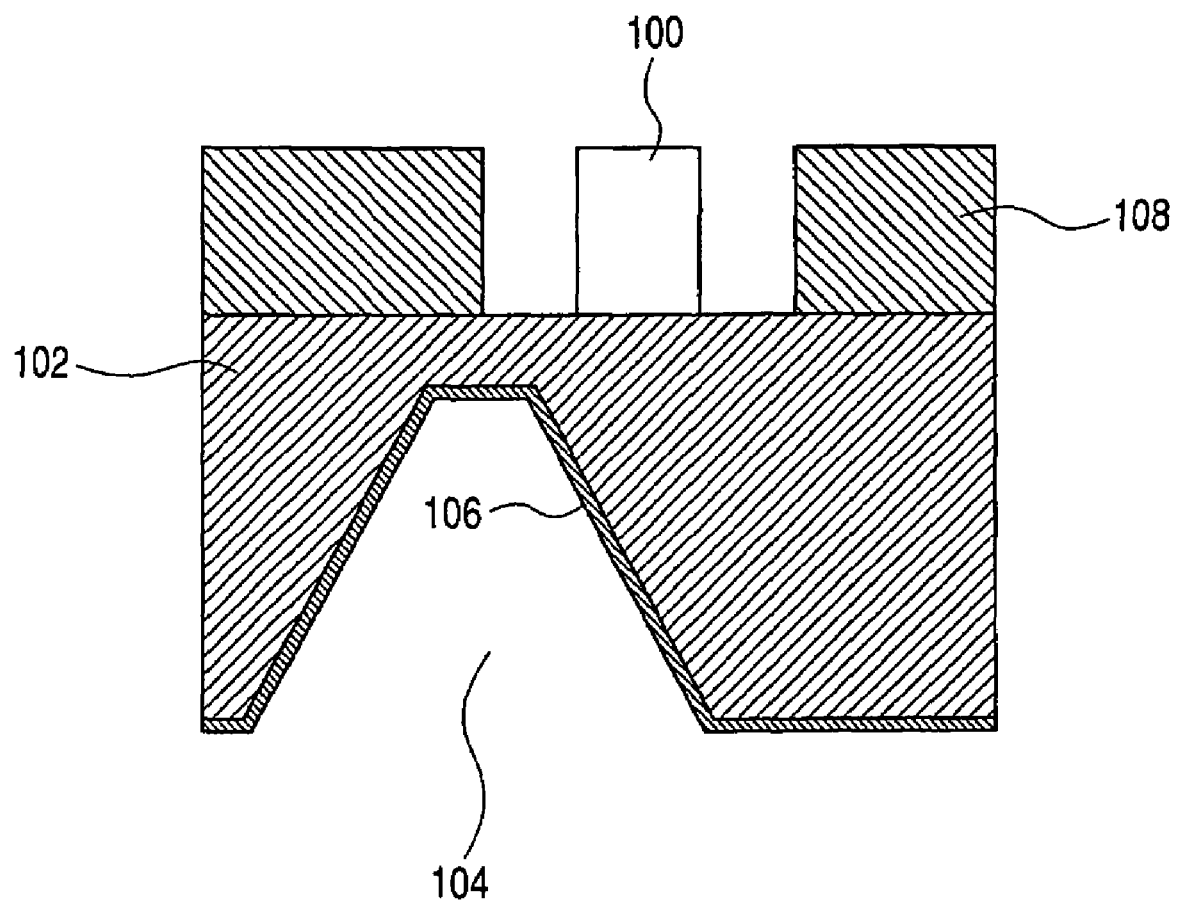
FIG. 1 is a schematic cross sectional view of the first embodiment of the present invention, which is an optical element device comprising a surface emission type light emitting element integrally formed with an optical path transforming structure.

FIG. 1 is a schematic cross sectional view of the first embodiment of the present invention, which is a light emitting element device comprising a surface emission type light emitting element. In FIG. 1, there are shown a surface emission type light emitting element 100 (VCSEL: vertical cavity surface emitting laser), which is a functional section of the light emitting element device, a growth substrate 102, an optical path transforming structure 104, a metal film (mirror) 106 of the optical path transforming structure 104 and a semiconductor layer 108. The surface emission type light emitting element 100, which is a functional section of the light emitting element device, and the metal film 106 of the optical path transforming structure 104 are arranged to show such a positional relationship that light emitted from the surface emission type light emitting element 100 is coupled to the optical path transforming structure 104 so as to turn the optical path by 90°.

Now, a method of preparing the light emitting element device integrally formed with the optical path transforming structure will be described below. FIGS. 2A through 2F are schematic illustrations of surface emission type light emitting element (VCSEL) integrally formed with the optical path transforming structure, showing a method of manufacturing it. In FIGS. 2A through 2F, there are shown a semiconductor layer 200, a growth substrate 202, a surface emission type light emitting element 204, a resist pattern 206, an optical path transforming structure 208 and a metal film (mirror) 210.

Firstly, as shown in FIG. 2A, a semiconductor layer (DBR layer, active layer, current constriction layer, etc.) 200 that is necessary to function as 980 nm band VCSEL is grown in the growth substrate 202 by means of MOCVD (metalorganic chemical vapor deposition) method. A GaAs(100) substrate is used as growth substrate 202. Then, a VCSEL 204 is formed by means of a photolithography technique, an etching technique or a film-forming technique as shown in FIG. 2B. Thereafter, as shown in FIG. 2C, the GaAs substrate 202 is polished until it shows a thickness of 100 μm. Then, as shown in FIG. 2D, a resist pattern 206 is formed by means of a photolithography technique on the surface of the GaAs substrate 202 opposite to the surface where the VCSEL 204 is formed in order to produce an optical path transforming structure 208 there. Note that FIG. 2DA is a view of the surface of the GaAs substrate 202 of FIG. 2D opposite to the surface where the VCSEL 204 is formed. Thus, a resist pattern 206 is formed as shown in FIG. 2DA. Then, as shown in FIG. 2E, an optical path transforming structure 208 is formed by wet-etching the growth substrate 202 by means of an $H_2SO_4$ based etchant. At this time, a forward mesa is formed with an angle of inclination of 45° along the [110] direction (in other words, the (111) plane is exposed). Thereafter, as shown in FIG. 2F, the resist pattern 206 is peeled off and subsequently a Cr/Au film is formed as metal film 210 by means of an electron beam evaporation system.

While FIGS. 2A through 2F show only a VCSEL 204 and an optical path transforming structure 208 in an enlarged scale, a number of VCSELs 204 can be formed integrally with optical path transforming structures simultaneously in a wafer. Therefore, it is possible to produce a light emitting element device comprising a single optical path transforming structure 208 and a VCSEL 204 integrally formed with it by dicing or cleaving the wafer after forming the metal film 210 of FIG. 2F. It is also possible to produce a device comprising a single optical path transforming structure 208 and an array of a plurality of VCSELs or a device comprising an array of a plurality of optical path transforming structures 208 and a corresponding array of a plurality of VCSELs.

While a 980 nm band VCSEL is used as surface emission type light emitting element of this embodiment, the present invention is by no means limited thereto. If the growth substrate does not absorb light of the emission wavelength (and hence transparent relative to light of the emission wavelength), a GaAs or Si substrate may be used as growth substrate for growing a 1,300 nm band VCSEL.

While an $H_2SO_4$ based etchant is used for forming an optical path transforming structure in this embodiment, the present invention is by no means limited thereto and a Br-methanol etchant or some other appropriate etchant may alternatively be used.

While an optical path transforming structure is formed by wet-etching in this embodiment, the present invention is by no means limited thereto and an optical path transforming structure 302 may alternatively be formed by means of a dry-etching technique of irradiating a reactive ion beam 300 onto the corresponding surface of the substrate with an angle of inclination as shown in FIGS. 3A1 and 3A2. The angle of inclination may be appropriately selected and 45° may preferably be selected as angle of inclination. An optical path transforming structure may alternatively be formed by means of a laser process.

Still alternatively, an optical path transforming structure 310 may be formed in a manner as shown in FIGS. 3B1 through 3B4. Firstly a resist (AZ9260) pattern 304 is formed on the rear surface of a substrate as shown in FIG. 3B1 so as to form a circular hole (FIGS. 3B2 and 3B2A). Thereafter, a resist pattern 306 having a rounded edge is produced by subjecting the resist pattern 304 to a reflow process at high temperature. Subsequently, a reactive ion beam 308 is irradiated perpendicularly onto the corresponding surface of the substrate for dry-etching (FIG. 3B3). As a result, the resist retreats and a semispherical optical path transforming structure 310 is produced (FIG. 3B4).

While the optical path transforming structure of this embodiment has a wedge-shaped profile with an angle of inclination of 45°, the present invention is by no means limited thereto and the optical path transforming structure may alternatively have a conical, pyramidal, semispherical (see FIG. 3B4) or some other profile. Then, light emitted from the surface emission type light emitting element (VCSEL) will be propagated as diffused light or oriented light depending on the manner in which emitted light is coupled to the optical path transforming structure.

While an optical path transforming structure is formed after forming a VCSEL in this embodiment, the present invention is by no means limited thereto and a VCSEL may be formed after forming an optical path transforming structure.

Figure 4A:
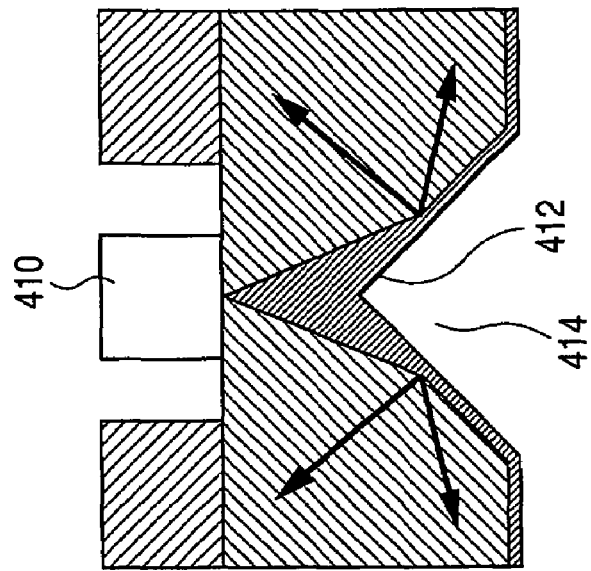
FIGS. 4A, 4AA, 4B and 4BA are schematic illustrations of embodiments obtained by modifying the first through third embodiments of optical element device according to the invention, showing how light is coupled to them.

Alternatively, referring to FIGS. 4A and 4AA, a pair of VCSELs may be formed simultaneously so that the laser beams 406 and 408 emitted from the respective VCSELs 402 and 404 are coupled respectively to the two slopes of a forward mesa optical path transforming structure 400 having an angle of inclination of 45°. With this arrangement, a same signal or two different signals may be propagated in two directions. Still alternatively, referring to FIGS. 4B and 4BA, an optical path transforming structure 414 may be so arranged that a laser beam 412 emitted from a VCSEL 410 with a large irradiation angle is coupled to the entire region of the optical path transforming structure 414 so that the laser beam may be propagated to a wider range.

Figure 5B:
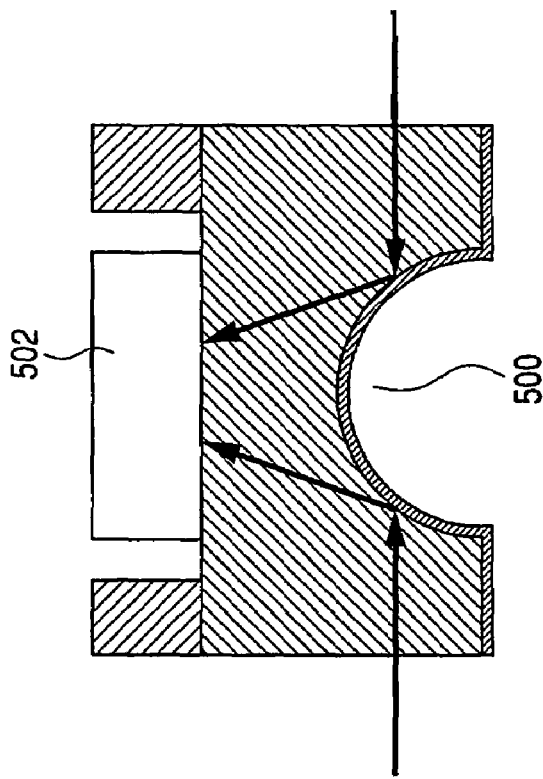
FIGS. 5A, 5AA, 5B and 5BA are schematic illustrations of embodiments obtained by modifying the first through third embodiments of optical element device according to the invention, showing how light is coupled to a light receiving element.
Figure 5A:
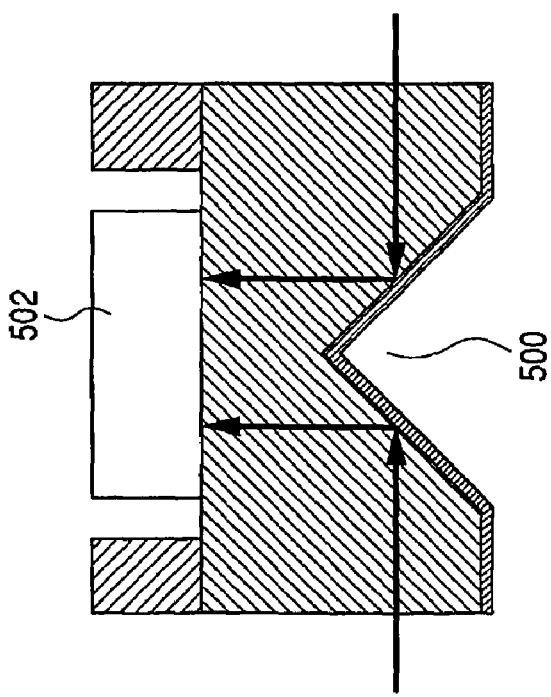
Figure 5B:
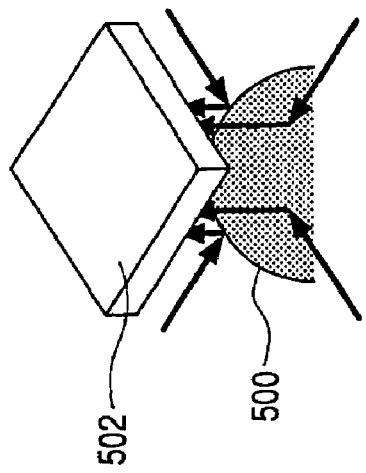
Figure 5A:
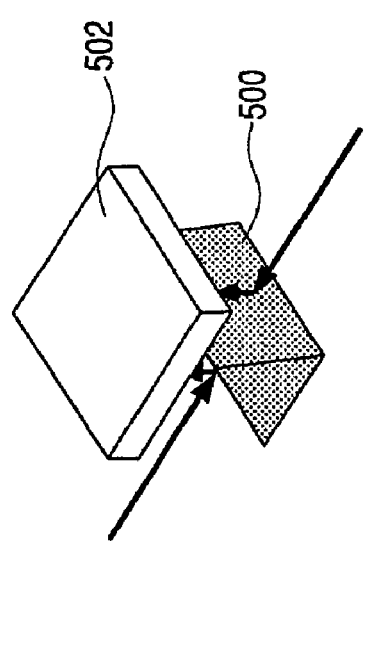

While the embodiment is described above by referring to a light emitting element, the above description basically applies when a light receiving element is used. When a light receiving element 502 having a light receiving surface as large as or larger than an optical path transforming structure 500 is prepared to show a positional relationship with the latter as shown in FIGS. 5A, 5AA, 5B, and 5BA the optical path of propagated light that is coupled to the optical path transforming structure 500 can be transformed so that propagated light may be received by the light receiving element 502. Light being propagated in two directions may be received by the light receiving element 502 when an optical path transforming structure 500 having a wedge-shaped profile is used as shown in FIGS. 5A and 5AA. Similarly, light being propagated in all directions may be received by the light receiving element 502 when an optical path transforming structure 500 having a semispherical profile is used as shown in FIGS. 5B and 5BA.

Embodiment 2

Figure 6:
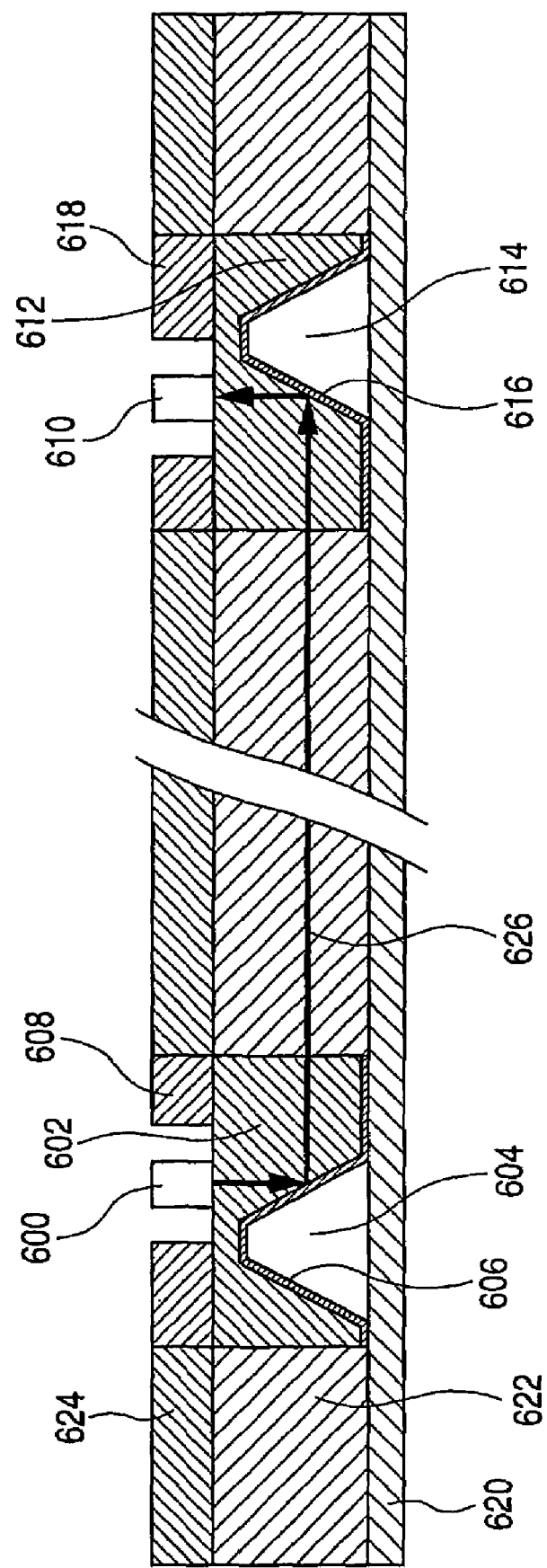
FIG. 6 is a schematic cross sectional view of the second embodiment of the present invention, which is a two-dimensional optical waveguide device comprising an optical element device including a pair of optical path transforming structures as well a surface emission type light emitting element and a light receiving element integrally formed with it.

FIG. 6 is a schematic cross sectional view of the second embodiment of the present invention, which is a two-dimensional optical waveguide device comprising an optical element device including a pair of optical path transforming structures as well a surface emission type light emitting element and a light receiving element integrally formed with it. In FIG. 6, there are shown a surface emission type light emitting element (VCSEL) 600, a pair of growth substrates 602 and 612, a pair of optical path transforming structures 604 and 614, metal films (mirrors) 606 and 616, a pair of semiconductor layers 608 and 618, a light receiving element 610, a first clad layer 620, a core layer 622, a second clad layer 624 and a laser beam 626. The two-dimensional optical waveguide is formed by using a combination of different materials showing respective refractive indexes that are different from each other, that is, by the core layer 622 and the first and second clad layers 620 and 624 that sandwich the core layer 622. In this embodiment, a 50 μm thick Z-type polycarbonate (PCZ) film showing a refractive index of 1.59 is used for the core layer 622 and a glass substrate showing a refractive index of 1.53 is used for the first clad layer 620, while a 15 μm thick norbornene resin film (ARTON) having a refractive index of 1.53 is used for the second clad layer 624.

In this embodiment, a 980 nm band VCSEL is used for the surface emission type light emitting element 600 that is integrally formed with the optical path transforming structure 604 and mounted so as to be buried in the two-dimensional waveguide. Since the optical path transforming structure 604 is formed in the growth substrate 602 of the VCSEL, the mounting operation entails only a small coupling loss to the core layer 622 and does not require any aligning operation. Similarly, the light receiving element that is integrally formed with the optical path transforming structure 614 can couple the laser beam 626 that is propagated through the core layer 622 to the light receiving element 610 only with a small coupling loss and can be mounted with ease. The optical path of the laser beam 626 emitted from the VCSEL 600 is turned by 90° by the metal film 606 of the optical path transforming structure 604 and the laser beam 626 is propagated through the core layer 622. Then, the laser beam 626 propagated through the core layer 622 is coupled to the light receiving element 610 that is integrally formed with the optical path transforming structure 614 having the metal film 616 so as to transmit an optical signal.

In this embodiment again, while a 980 nm band VCSEL is used for the surface emission type light emitting element, the present invention is by no means limited thereto. If the growth substrate does not absorb light of the emission wavelength (and hence transparent relative to light of the emission wavelength), a GaAs or Si substrate may be used as growth substrate for growing a 1,300 nm band VCSEL.

Now, a method of preparing a two-dimensional optical waveguide device according to the invention will be described below. FIGS. 7A through 7F are schematic illustrations of the second embodiment of two-dimensional optical waveguide device according to the invention, showing a method of manufacturing it. In FIGS. 7A through 7F, there are shown a first clad layer 700, a core layer 702, a second clad layer 704, an etching mask 706, holes 708 for mounting respective optical elements, a light emitting element (VCSEL) 710 integrally formed with an optical path transforming structure and a light receiving element 712 integrally formed with an optical path transforming structure.

Firstly, as shown in FIG. 7A, a 50 μm thick core layer 702 is formed on a glass substrate that operates as the first clad slayer 700 by applying and hardening polycarbonate resin whose refractive index greater than that of the glass substrate. Then, as shown in FIG. 7B, a 15 μm thick second clad layer 704 is formed by applying and hardening norbornene resin whose refractive index is smaller than that of the core layer 702. Subsequently, as shown in FIG. 7C, an etching mask 706 for forming mounting holes 708 in the second clad layer 704 and the core layer 702 is prepared. The etching mask 706 is made of Ti film that is formed by using a photolithography technique and a film forming technique. Then, as shown in FIG. 7D, the mounting holes 708 are produced by dry-etching the second clad layer 704 and the core layer 702 with $O_2$ gas. Thereafter, the etching mask 706 is removed as shown in FIG. 7E. Subsequently, as shown in FIG. 7F, a VCSEL 710 integrally formed with an optical path transforming structure and a light receiving element 712 integrally formed with an optical path transforming structure that are prepared by the method illustrated in FIGS. 2A through 2F, FIGS. 3A1 and 3A2 or FIGS. 3B1 through 3B4 are inserted and mounted in the respective mounting holes 708.

In this embodiment, while Z-type polycarbonate, glass and norbornene resin are used respectively for the core layer, the first clad layer and the second clad layer, the present invention is by no means limited thereto. A combination of polyimide resin and acryl resin may be used for the core layer if the refractive index of the core layer is greater than those of the materials of the first and second clad layers. Additionally, the thicknesses of the layers are not limited to the respective values cited above for this embodiment. For example, if a two-dimensional optical waveguide layer having a thickness of tens of several micrometers is formed by using a resin film in place of a glass substrate 700, it can be a flexible layer. Still additionally, the first and second clad layers may not necessarily be provided.

While the mounting holes 708 are formed by dry-etching in this embodiment, the present invention is by no means limited thereto. When each of the core layer and the clad layer is formed by using a photosensitive material, the mounting holes may be formed by means of a photolithography technique or a laser process.

Embodiment 3

Figure 8:
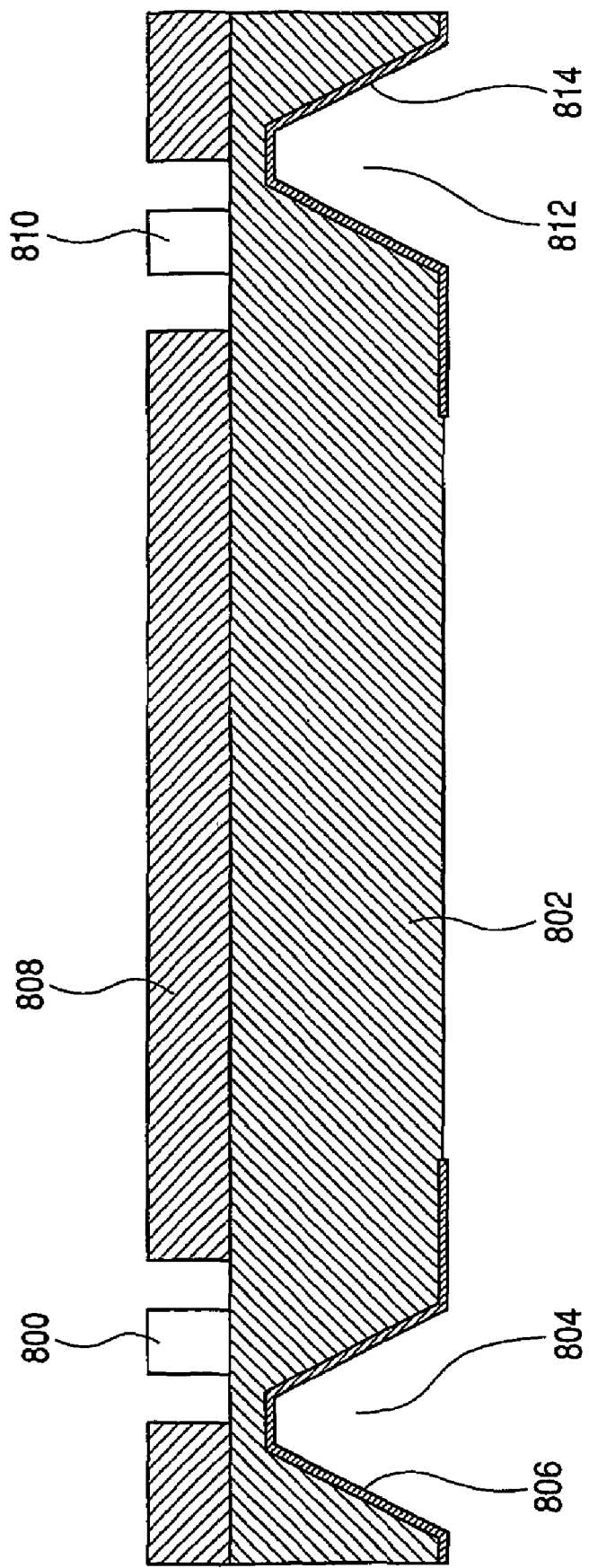
FIG. 8 is a schematic cross sectional view of the third embodiment of the present invention, which is also a two-dimensional optical waveguide device comprising a surface emission type light emitting element that is integrally formed with an optical path transforming structure and a light receiving element that is integrally formed with an optical path transforming structure on a same growth substrate.

The third embodiment is a two-dimensional optical waveguide device in which a surface emission type light emitting element that is integral with an optical path transforming structure and a light receiving element that is also integral with an optical path transforming structure are formed on a same growth substrate while light emitted from the surface emission type light emitting element is propagated through the growth substrate that operates as optical waveguide layer and propagated light is coupled to the light receiving element to transmit an optical signal. FIG. 8 is a schematic cross sectional view of this embodiment of two-dimensional optical waveguide device. In FIG. 8, there are shown a surface emission type light emitting element 800, a growth substrate 802, a pair of optical path transforming structures 804 and 812, a pair of metal films (mirrors) 806 and 814, a semiconductor layer 808 and a light receiving element 810.

The surface emission type light emitting element 800 and the optical path transforming structure 804 are arranged to show such a positional relationship that light emitted from the surface emission type light emitting element (VCSEL) 800 is coupled to the optical path transforming structure 804 so as to turn the optical path by 90°, while the light receiving element 810 and the optical path transforming structure 812 are arranged to show such a positional relationship that the optical path of light emitted from the VCSEL 800 is turned by 90° by the optical path transforming structure 812 and coupled to the light receiving element 810. Thus, the optical path of the laser beam emitted from the VCSEL 800 is turned by 90° by the optical path transforming structure 804 and the laser beam is propagated through the growth substrate 802. Then, the optical path of the laser beam is turned once again by 90° by the optical path transforming structure 812 and the laser beam is coupled to the light receiving element 810 so as to transmit an optical signal. At this time, light emitted from the VCSEL 800 is propagated without being absorbed by the growth substrate 802 so that the growth substrate 802 itself can be used as waveguide.

Now, a method of preparing a two-dimensional optical waveguide device comprising a surface emission type light emitting element that is integrally formed with an optical path transforming structure and a light receiving element that is integrally formed with an optical path transforming structure on a same growth substrate will be described below. FIGS. 9A through 9F are schematic cross sectional views of the third embodiment of the present invention, which is a two-dimensional optical waveguide device, showing a method of manufacturing it. In FIGS. 9A through 9F, there are shown a growth substrate 900, a semiconductor layer 902, a surface emission type light emitting element (VCSEL) 904, a light receiving element 906, a resist pattern 908, a pair of optical path transforming structures 910 and 912 and a pair of metal films (mirrors) 914 and 916.

Figure 9D:
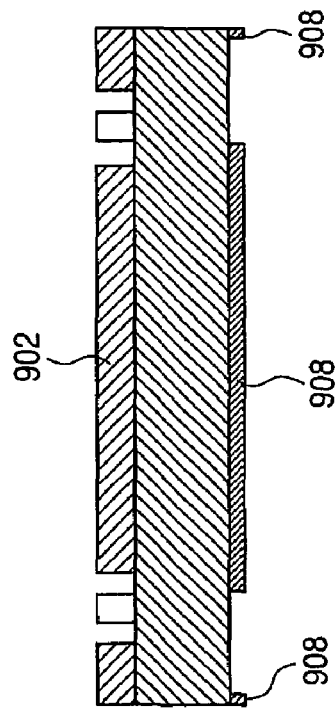
FIGS. 9A, 9B, 9C, 9D, 9E and 9F are schematic illustrations of the third embodiment of the present invention, which is also a two-dimensional optical waveguide device, showing a method of manufacturing it.
Figure 9E:
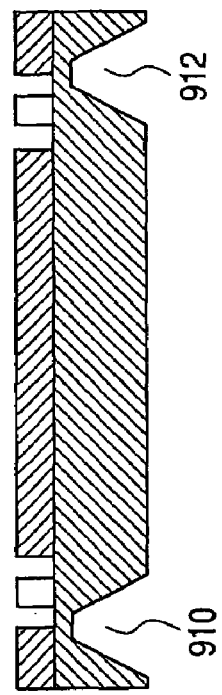
Figure 9F:
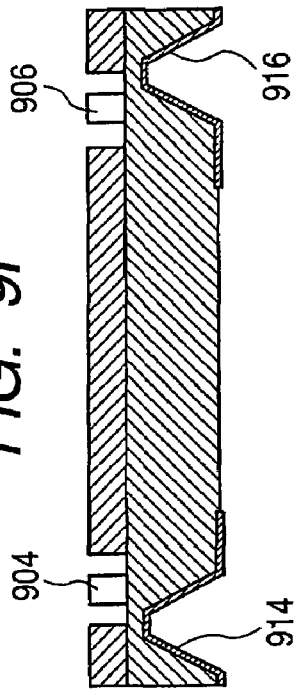
Figure 9A:
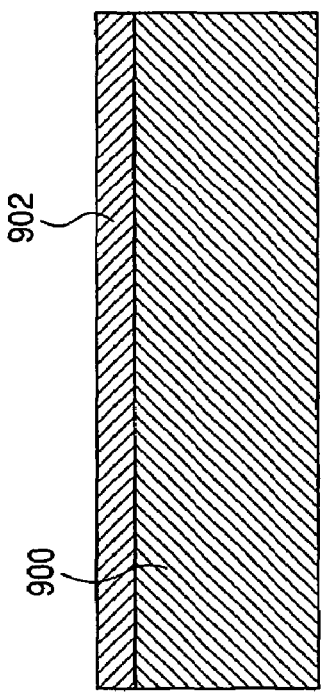
Figure 9B:
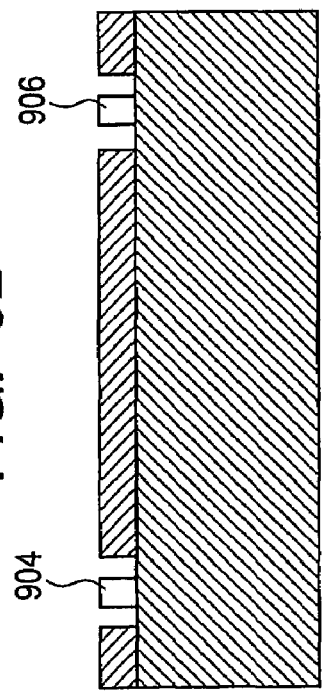
Figure 9C:
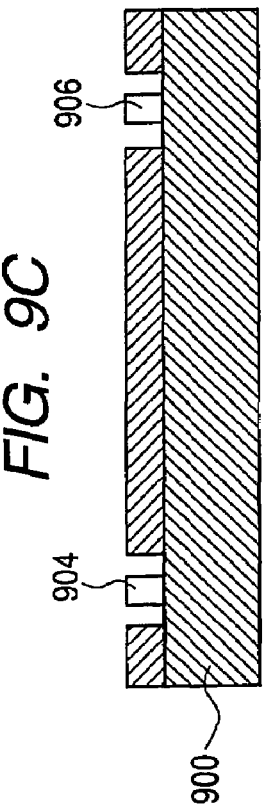

Firstly, as shown in FIG. 9A, a semiconductor layer 902 that is necessary to function as VCSEL and light receiving element is made to grow on the growth substrate 900 by means of a MOCVD technique. A GaAs(100) substrate is used for the growth substrate 900. Then, as shown in FIG. 9B, a VCSEL 904 and a light receiving element 906 are formed by means of a photolithography technique, an etching technique or a film forming technique. Thereafter, as shown in FIG. 9C, the GaAs substrate 900 is polished until it shows a thickness of 100 μm. Subsequently, as shown in FIG. 9D, a resist pattern 908 is formed for the purpose of forming optical path transforming structures 910 and 912 by means of a photolithography technique on the surface of the GaAs substrate 900 opposite to the surface where the VCSEL 904 and the light receiving element 906 are formed. Then, as shown in FIG. 9E, the optical path transforming structures 910 and 912 are actually produced by wet-etching using an $H_2SO_4$ based etchant. At this time, a forward mesa is formed along the [110] direction (in other words, the (111) plane is exposed). Thereafter, as shown in FIG. 9F, the resist pattern 908 is peeled off and subsequently Cr/Au films are formed as metal films 914 and 916 by means of an electron beam evaporation system.

While FIGS. 9A through 9F show only a VCSEL, a light receiving element and optical path transforming structures in an enlarged scale, a number of VCSELs and light receiving elements can be formed integrally with optical path transforming structures simultaneously in a wafer. Therefore, it is possible to produce a two-dimensional optical waveguide device comprising a desired number of VCSELs integrally formed with optical path transforming structures and a desired number of light receiving elements also integrally formed with optical path transforming structures by dicing or cleaving the wafer after forming the metal films 914 and 916 of FIG. 9F.

While an $H_2SO_4$ based etchant is used for forming optical path transforming structures in this embodiment, the present invention is by no means limited thereto and a Br-methanol etchant or some other appropriate etchant may alternatively be used. While optical path transforming structures are formed by wet-etching in this embodiment, the present invention is by no means limited thereto and optical path transforming structures 302 may alternatively be formed by means of a dry-etching technique of irradiating a reactive ion beam 300 onto the corresponding surface of the substrate with an angle of inclination of 45° as shown in FIGS. 3A1 and 3A2. An optical path transforming structure may alternatively be formed by means of a laser process. Furthermore, optical path transforming structures 310 having a semispherical profile as shown in FIGS. 3B1 through 3B4 may alternatively be formed.

While the optical path transforming structures of this embodiment have a wedge-shaped profile with an angle of inclination of 45°, the present invention is by no means limited thereto and the optical path transforming structure may alternatively have a conical, pyramidal, semispherical or some other profile as described above by referring to the first embodiment. Then, light emitted from each of the surface emission type light emitting elements (VCSEL) will be propagated into the two-dimensional optical waveguide device as diffused light or oriented light depending on the manner in which emitted light is coupled. While optical path transforming structures are formed after forming VCSELs in this embodiment too, the present invention is by no means limited thereto and VCSELs may be formed after forming optical path transforming structures.

Figure 4B:
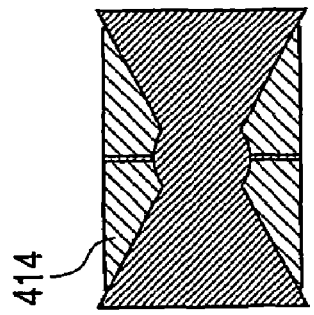
Figure 4A:
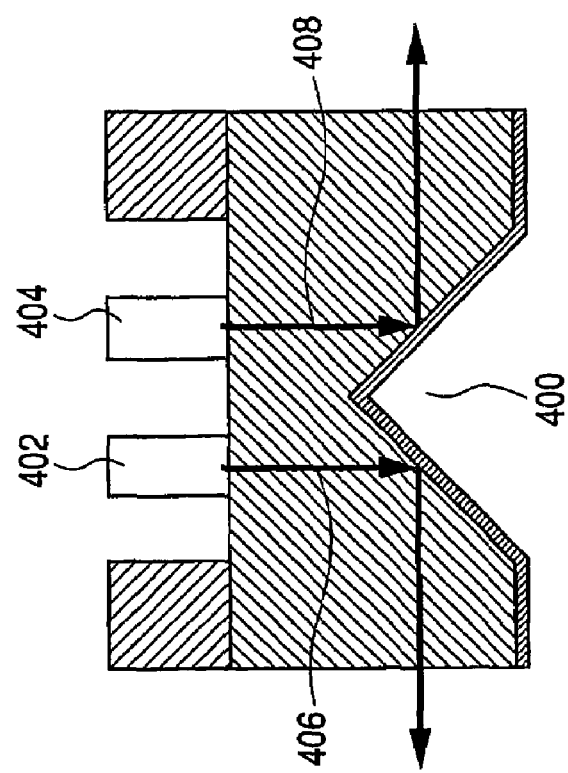
Figure 4B:
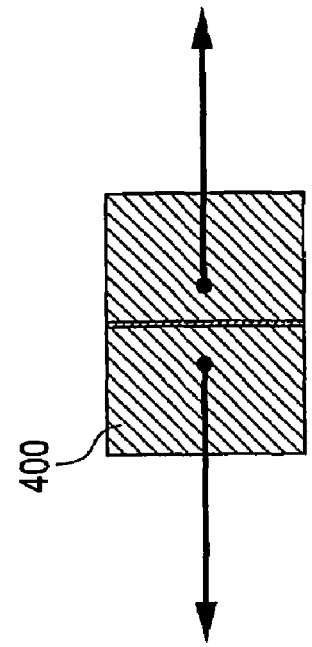

The arrangement as described above for the first embodiment by referring to FIGS. 4A and 4B may also be used for this embodiment. While this embodiment is described above by referring to light emitting elements, the above description basically applies to light receiving elements. More specifically, the arrangement as described above for the first embodiment by referring to FIGS. 5A and 5B may also be used for this embodiment.

Embodiment 4

Figure 10B:
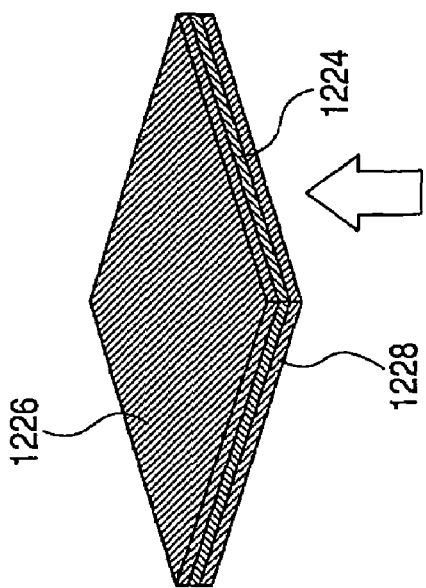
FIGS. 10A and 10B are schematic illustrations of the fourth embodiment of the present invention, which is an optoelectronic circuit board according to the invention.
Figure 10A:
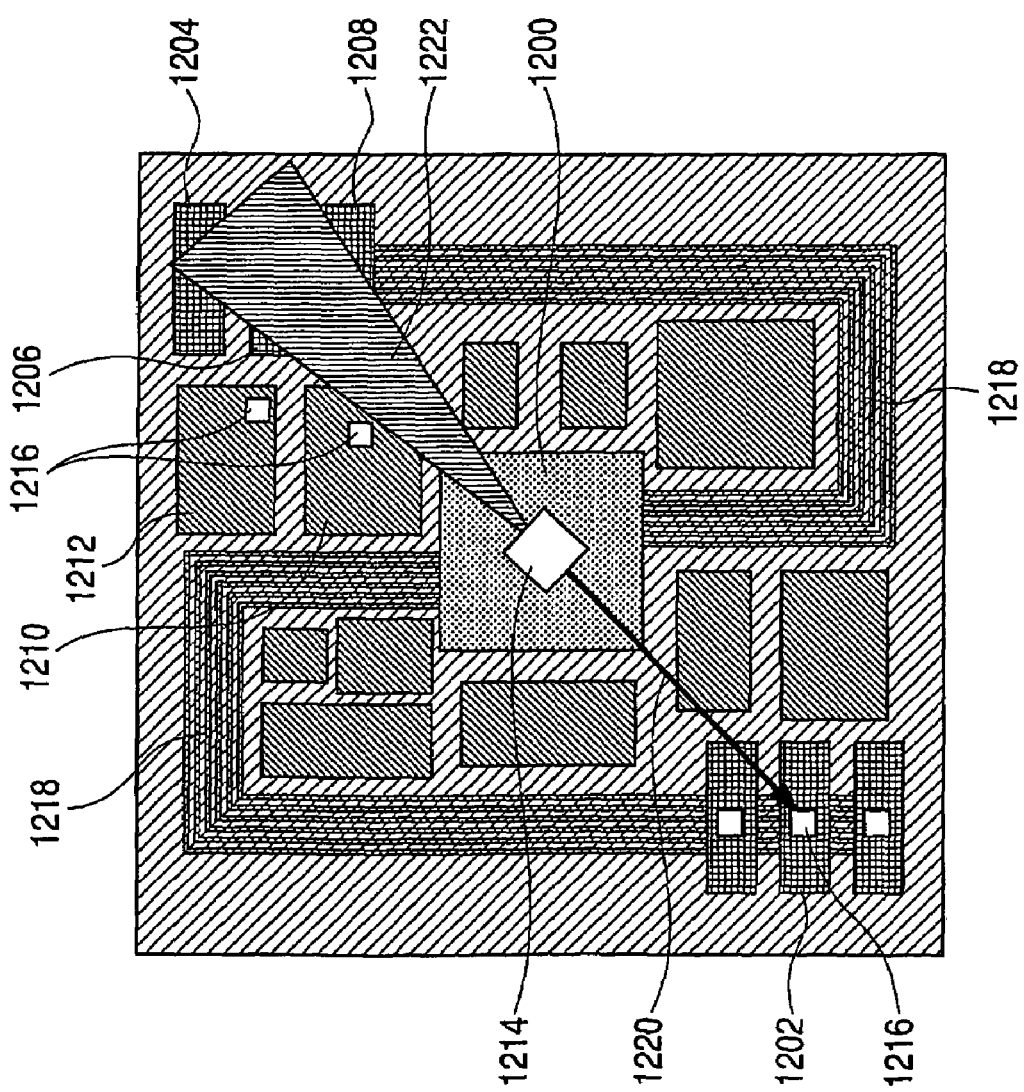

The fourth embodiment is an optoelectronic circuit board realized by combining a two-dimensional optical waveguide device as described above by referring to the second embodiment and electric circuit boards. FIGS. 10A and 10B schematically illustrate this embodiment. In FIGS. 10A and 10B, there are shown a CPU 1200, RAMs 1202, 1204, 1206 and 1208, electronic devices (LSIs) 1210 and 1212, an 1×2 VCSEL array 1214, light receiving elements 1216, transmission wires (electric wires) 1218, a beam of light 1220, diffused light 1222, a two-dimensional optical waveguide layer 1224 and electric circuit boards 1226 and 1228. FIG. 10A is a view of the optoelectronic circuit board as seen in the direction of arrow in FIG. 10B. The two-dimensional optical waveguide layer 1224 and the electric circuit board 1228 are not shown in FIG. 10A.

FIG. 11 is a schematic cross sectional view of part of an optoelectronic circuit board located near a VCSEL array that is connected to a CPU. The CPU 1300 is secured onto the electric circuit board 1302 by flip chip bonding, using a solder ball 1304. The VCSEL 1308 that is contained in a two-dimensional optical waveguide layer 1306 and formed integrally with an optical path transforming structure and the CPU 1300 are connected to each other by way of internal wires 1310 formed in an electric circuit board 1302. The two-dimensional optical waveguide layer 1306 is sandwiched between a pair of electric circuit boards 1302.

While low speed data transfers do not give rise to any particular problems in conventional electric circuit boards, the influence of EMIs and wiring delays can make it difficult to transfer data constantly on a stable basis when transmitting a large volume of data at high speed. If such is the case, it is possible to transmit a large volume of data at high speed on a stable basis by using an optoelectronic circuit board as shown in FIGS. 10A and 10B. A method of converting an electric signal from the CPU into an optical signal by way of the VCSEL and transmitting the optical signal to a light receiving device that is electrically connected to a RAM and an LSI will be described below. As shown in FIGS. 10A and 10B, the 1×2 VCSEL array 1214 that is integrally formed with the optical path transforming structures connected to the CPU 1200 is buried in the two-dimensional waveguide layer and the laser beam emitted from each of the VCSELs is coupled to the corresponding optical path transforming structure (not shown) and propagated through the two-dimensional optical waveguide layer. At this time, propagation of an oriented beam of light and/or that of diffused light can be selected by controlling the electric current injected onto each of the VCSELs. The laser beam propagated through the two-dimensional optical waveguide layer is coupled to an optical path transforming structure (not shown) arranged near the light receiving element and led to the light receiving element. The light receiving element is connected to the corresponding RAM and the corresponding LSI and converts the optical signal into an electric signal.

Referring to FIGS. 10A and 10B, a high speed signal is transmitted to the RAM 1202 by means of propagation of a beam of light 1220 and also simultaneously to three RAMs including RAM 1204, RAM 1206 and RAM 1208 by means of propagation of diffused light 1222 by controlling the electric current injected into each of the VCSELs of the 1×2 VCSEL array 1214. Although not shown, it is also possible to transmit the signal to LSI 1210 and LSI 1212 by controlling the injected electric current and expanding the angle of propagation of diffused light. The CPU, the RAMs and the LSIs are connected to the VCSELs and the light receiving element so that they can mutually transmit and receive an optical signal.

While a 1×2 surface emission type laser array is used in this embodiment, the present invention is by no means limited thereto and much more surface emission type laser may be arranged to form an array. While the two-dimensional optical waveguide layer has a single layer structure in this embodiment, it may alternatively have a multilayer structure. While the optoelectronic circuit board of this embodiment shows a structure where an optical wiring layer is sandwiched between a pair of electric wiring layers, the present invention is by no means limited thereto and the optical wiring layer may alternatively be arranged on or under an electric wiring layer. Still alternatively, an electric wiring layer may be sandwiched between a pair of optical wiring layers.

It should be noted here that it is not necessary to transmit a signal by means of light. An optoelectronic circuit board according to the invention is designed to show an enhanced degree of flexibility for signal selection so that a signal may also be transmitted by way of electric wires. Selection of light or electricity for signal transmission is determined by the device that controls the signal transmission.

With the use of a two-dimensional optical waveguide layer, it is possible to significantly reduce electromagnetic radiation noises that give rise to circuit operation errors of conventional signal lines due to common mode noise radiations where wires themselves operate as antenna. Then, it is also possible to improve the problem of EMIs.

Additionally, propagation of a beam of light and/or that of diffused light can be selected by controlling the electric current injected onto each of the VCSELs so that high speed signal transmission is possible by suppressing any loss of power when propagation of a beam of light is selected, whereas the angle of diffused light can be modified by modifying the injected electric current when propagation of diffused light is used. In this way, it is possible to reconfigure the region of optical signal transmission.

Embodiment 5

Figure 12:
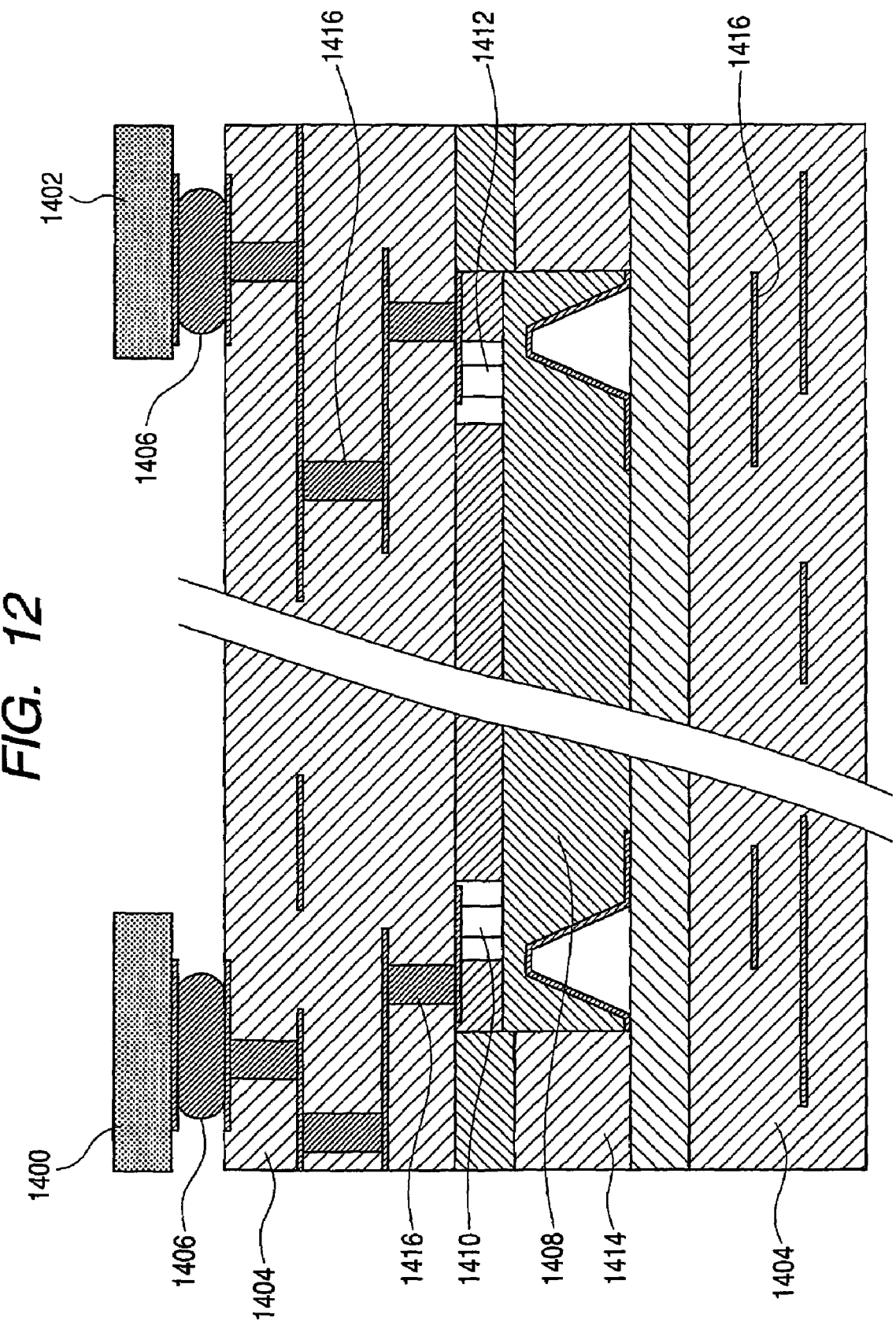
FIG. 12 is a schematic cross sectional view of the fifth embodiment of the present invention, which is also an optoelectronic circuit board, illustrating the inside thereof.

The fifth embodiment of the invention is an optoelectronic circuit board prepared by combining a two-dimensional optical waveguide device as described above by referring to the third embodiment and an electric circuit board. FIG. 12 shows this embodiment. In FIG. 12, there are shown a CPU 1400, a RAM 1402, an electric circuit board 1404, a solder ball 1406, an entire two-dimensional optical waveguide device 1408, a VCSEL 1410, a light receiving element 1412, a two-dimensional optical waveguide layer 1414 and an internal electric wiring layer 1416.

The two-dimensional optical waveguide device 1408 of this embodiment comprises a single VCSEL 1410 and a single light receiving element 1412 that are integrally formed with respective optical path transforming structures. An oriented laser beam is propagated between the VCSEL 1410 and the light receiving element 1412 to realize high speed optical signal transmission.

While not shown, the scope of freedom of selection of modes of optical transmission (propagation of a beam and that of diffused light) will be broadened when the VCSEL and the light receiving element that are integral with respective optical path transforming structures are buried in the two-dimensional optical waveguide layer 1414 as in the case of the modified arrangements of the first and third embodiments.

While the two-dimensional optical waveguide device of this embodiment comprises a single VCSEL and a single light receiving element that are integral with respective optical path transforming structures, the present invention is by no means limited thereto and a two-dimensional optical waveguide device comprising a plurality of VCSELs and a plurality of light receiving elements may alternatively be used. Otherwise, this embodiment is similar to the third embodiment.

This application claims priority from Japanese Patent Application No. 2003-293666 filed Aug. 15, 2003, which is hereby incorporated by reference herein.

The invention claimed is:

1. An optical element device comprising:
   a light emitting element; and
   a substrate mounting the light emitting element thereon and having an optical path transforming structure,
   wherein an integral semiconductor body comprises each of the light emitting element and the substrate, whereby a surface of the light emitting element and a surface of the substrate are attached to each other,
   wherein the optical path transforming structure is configured to change a light proceeding direction to couple light from the light emitting element with a light receiving element, and
   wherein the substrate comprises a GaAs layer and a semiconductor layer, and the light emitting element is formed on the GaAs layer and the optical path transforming structure is formed on the semiconductor layer.

2. The device according to claim 1, wherein the substrate is configured such that it does not absorb light being propagated from the light emitting element.

* * * * *